United States Patent [19]
Turrill et al.

[11] 3,860,621
[45] Jan. 14, 1975

[54] METHOD OF RECOVERY OF A FUCHSINE SALT

[75] Inventors: Frank Hollister Turrill, Huntington, W. Va.; Lyle Eli Squire, Winterhaven, Fla.; Jack Lewis Towle, Holland, Mich.

[73] Assignee: Chemetron Corporation, Chicago, Ill.

[22] Filed: Jan. 2, 1973

[21] Appl. No.: 320,540

[52] U.S. Cl. ............................................... 260/391
[51] Int. Cl. .......................................... C09b 11/12
[58] Field of Search .................................. 260/391

[56] References Cited
UNITED STATES PATENTS

| | | | |
|---|---|---|---|
| 3,679,713 | 7/1972 | Feldman et al. | 260/391 |
| 3,686,233 | 8/1972 | Gordon et al. | 260/391 |

*Primary Examiner*—Lorraine A. Weinberger
*Assistant Examiner*—L. A. Thaxton
*Attorney, Agent, or Firm*—N. M. Esser

[57] ABSTRACT

A precipitant is added to a mixture of aniline and a fuchsine salt and a purified fuchsine salt is separated from the resulting slurry.

9 Claims, No Drawings

METHOD OF RECOVERY OF A FUCHSINE SALT

This invention relates to a method of purification of a fuchsine salt. More particularly it relates to a method of recovery of a fuchsine salt from a mixture thereof with aniline. Even more particularly the invention relates to the recovery of a purified fuchsine salt from a mother liquor containing said salt and organic by-products from the synthesis of said salt. Still more particularly, this invention relates to a method of recovery of a highly pure fuchsine salt from the reaction mixture in which it is prepared.

Fuchsine salts are important intermediates in the production of pigments such as spirit blue and alkali blue. These salts are made by the oxidation of an aniline solution of 4,4-methylenedianiline, for example, in the presence of an acid such as hydrochloric acid or nitric acid. Substantial quantities of organic by-products are formed also and these must be removed in order to obtain a fuchsine salt of sufficient purity to give an acceptable alkali blue pigment.

A significant amount of fuchsine hydrochloride is dissolved by aniline and filtration of a crude reaction mixture gives a recovery of only about 16% at a filtration temperature of 95°C. A further disadvantage is that the fuchsine hydrochloride crystals are small and form a closely packed filter cake, causing a slow filtration rate, retention of the mother liquor in the filter cake and, consequently, contamination of the fuchsine hydrochloride with reaction by-products.

Steam distillation of the aniline from the reaction mixture is one method used heretofore for the recovery of the fuchsine salt. An aqueous solution of the salt, formed during the distillation, is filtered to remove water-insoluble by-products and the fuchsine salt is recovered by crystallization. This is a costly, time consuming process and the yield and purity of the product vary from batch to batch.

In another prior art method of recovering fuchsine, a reaction mixture containing fuchsine hydrochloride is acidified with hydrochloric acid until a yellow coloration replaces the normal intense red. The pH at this point is about 2. A decolorizing carbon is added and the mixture is stirred for 1 hour at 50°C. The mixture is filtered and sodium hydroxide is added to the filtrate until a brownish "coffee" coloration is obtained at a pH of about 11. The mixture is dried and filtered again; the basic filtrate is a solution of the carbinol base of fuchsine. Incomplete separation of the by-products gives rise to a "dirty" alkali blue compared to the pigment obtainable from the fuchsine hydrochloride recovered by the method of this invention. A further disadvantage is the high cost of manufacture caused by the use of large quantities of unrecovered acid and base.

Fuchsine nitrate is less soluble in aniline than the hydrochloride but recovery of this salt by prior art methods is only about 75–80%. Furthermore, the fuchsine nitrate crystals are small, regular hexagonal plates which aggravate the close packing of filter cakes mentioned above. Moreover, a mixture of organic nitrates is potentially explosive and heating a reaction mixture containing such salts is dangerous.

There remains, therefore, a need for a method of recovering high quality fuchsine salts in good yields for the manufacture of pigment grade alkali blue.

A principal object of this invention is to provide improved yields of fuchsine salts.

Another object of this invention is to provide purer fuchsine salts.

A further object of this invention is to provide a safe method of recovery of fuchsine salts.

The attainment of these and other objects of the invention will be apparent from the following description.

The invention is a method of recovery of a salt having the formula:

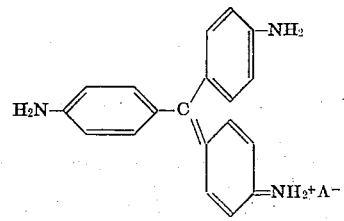

wherein A is a chloride or nitrate ion, from a mixture containing said salt and aniline, said method comprising the steps of adding at least one precipitant selected from the class consisting of hydrocarbons, chlorinated hydrocarbons, alcohols, ethers, and pyridines to the mixture and separating the precipitate at a temperature below the decomposition temperature of the mixture.

The advantages of the method are better realized when the precipitant is added to reaction mixture in which the desired salt is prepared but it may be added to the mother liquor after an initial separation of a portion of the desired salt from the reaction mixture. Purification of a fuchsine salt after recovery by other methods may also be accomplished by adding one or more of the precipitants of the above class to a solution of the salt in aniline or by triturating a mixture of the salt with aniline and one or more of the precipitants, and, in each instance, separating the purified solids from the liquid phase.

The reaction mixture usually contains acid in excess of that required to form the fuchsine salt thereof. A substantial portion of the excess acidity may be neutralized by the addition of a base such as ammonia or an aqueous solution of ammonium hydroxide, sodium hydroxide or potassium hydroxide. The pH is usually adjusted to from about 4 to about 7.5 before the precipitant is added but this may be deferred until after said addition. A pH of from about 6 to about 7 is preferred. More preferably, it is from about 6.2 to about 6.8.

The precipitant is a relatively poor solvent for the fuchsine salt, compared with aniline, but it is a good solvent for the organic by-products formed during the synthesis of the salt. For this reason, the terms "precipitant," "solvent-precipitant," and "solvent" are used interchangeably herein.

The ratio of precipitant to reaction mixture is usually from about 0.25:1 to about 0.75:1 part by weight. A preferred ratio is from about 0.3:1 to about 0.6:1. It is preferable that the precipitant be miscible with aniline at ratios of from about 1.2:1 to about 1:4 parts by weight at a temperature of about 50°C. or higher. Solvents having a melting point of about 125°C. or less are highly desirable. The boiling point of the solvent is usually above about 25°C. and is preferably about 50°C. or higher, and because it is economically desirable to reuse the aniline and solvent, a solvent easily separable from aniline by distillation is favored. A preferred solvent has a flash point above about 45°C. one having a flash point of about 175°C. or higher is even more preferred.

The hydrocarbons contemplated for use in the method of this invention may be saturated or unsaturated, aliphatic, cycloaliphatic, aromatic, or alkylaromatic. The aliphatic hydrocarbons may have straight chains or branched chains of from about 6 to about 20 carbon atoms and are exemplified by the heptanes, octanes, octenes, nonanes, dodecanes, hexadecanes, and eicosanes. The cycloaliphatic hydrocarbons usually have from 6 to 9 carbon atoms, as exemplified by cyclohexane.

The aromatic and alkylaromatic hydrocarbons having from 6 to about 24 carbon atoms are preferred. Examples of this group include benzene, biphenyl, tetralin, toluene, diethylbenzene, di- and triisopropylbenzene, xylene, butylbenzene, amylbenzene, naphthalene, methylnaphthalene, p-cymene, cumene, diphenylmethane, decyl-, dodecyl-, tetradecyl-, hexadecyl-, and octadecyl benzene. The alkylbenzenes, especially the monoalkylbenzenes, are the more preferred solvent-precipitants. Mixtures of the above such as the fractions of alkylbenzenes collected over an arbitrary boiling point range during the distillation of detergent alkylates may also be used. A highly preferred solvent for the method of this invention is a mixture of alkylbenzenes commercially designated as dodecylbenzene but which contains significant amounts of decyl-, undecyl-, and tridecylbenzene as well.

The hydrocarbon moiety of the chlorinated hydrocarbons contemplated may be saturated or unsaturated, aliphatic, aromatic, or alkyl aromatic. The chlorine atoms must be non-labile under the conditions of the recovery process. Examples of such a solvent include perchloroethylene, tetrachloroethane, chlorobenzene, dichlorobenzene, and p-chlorotoluene. Mixtures may also be used.

The ethers may be symmetrical or asymmetrical, cyclic, aliphatic, aromatic or mixed aliphatic-aromatic. Examples of the contemplated ethers include dihexyl ether, diphenyl ether, anisole, diallyl ether, tetrahydrofuran, dioxane, the dimethyl ether of ethylene gycol, ethyl n-butyl ether and the like. Ethers having a total of at least about 6 carbon atoms are preferred. Mixtures of different ethers may be used.

Mono-hydroxy alcohols having a straight or branched chain aliphatic hydrocarbon moiety are also contemplated. Secondary alcohols are especially useful. The total number of carbon atoms is desirably 4 or more and preferably 6 or more. Still more preferable are those having from 8 to 12 carbon atoms. The alcohols are exemplified by 2-ethylhexanol, 2,6-dimethyl-4-heptanol, n-butanol, benzyl alcohol, 2,6,8-trimethyl-4-nonanol and the like. Alcohol mixtures may be used.

Pyridines, including the quinolines and alkylated pyridines, are useful as a solvent-precipitant in the method of this invention. The alkylated pyridines usually have from 1 to 5 alkyl groups and a total of about 10 carbon atoms. A preferred alkylpyridine is 2,4,6-trimethylpyridine but the other collidines and the lutidines and picolines are further examples of the pyridines which may be used. Mixtures of pyridines may be used, also.

The temperature during the recovery and purification process may be from about 0°C. up to the decomposition temperature of the mixture. Superatmospheric pressure may be applied to minimize losses of the aniline and precipitant by vaporization. The temperature is usually from about 50°C. to about 125°C. whether recovery from the reaction mixture or from the mother liquor or purification by recrystallization or trituration is desired. When the salt is being recovered from the reaction mixture the precipitant is usually added to the stirred mixture at a uniform rate at from about 50°C. to about 125°C. but a preferred addition temperature is from about 80°C. to about 110°C. A more preferred addition temperature is from about 90°C. to about 95°C. The addition may be made at a temperature lower than 50°C. but it is preferable that the temperature at the time of separation of the precipitate be higher than 50°C.

The reaction mixture is dehydrated to substantial dryness, usually after the pH has been adjusted, but it may be done before in some instances. Preferably, the water content is about 2.5 percent or less and more preferably from 0 to about 1 percent by weight of the reaction mixture. The dehydration may be accomplished by distillation of the water at atmospheric or subatmospheric pressures and usually at a temperature of about 120°C. or less. In some instances azeotropic distillation with the solvent is possible.

The solubility of the desired salt in the solvent/aniline pair decreases as the temperature of the mixture is increased and thus a high filtration temperature which enhances the rate of filtration and draining of the filter cake is feasible. Moreover, fuchsine hydrochloride crystals produced by the method of this invention are irregular and thus closely packed filter cakes are avoided. Separation of the precipitate from the mother liquor is usually carried out at atmospheric pressure. The advantages of a high temperature during filtration may also be realized when centrifugation or other commonly used separation techniques are employed.

The method of this invention is illustrated in the following examples. Parts by weight are used in each instance. Spectrophotometric assays of the reaction mixture and filtrate are used to determine the amount of fuchsine salt present before and after the recovery.

EXAMPLE 1

A reaction mixture (863 parts) resulting from a catalytic air oxidation of an aniline solution of 4,4-methylenedianiline hydrochloride by a method similar to that described in U.S. Pat. No. 2,542,544 and containing approximately 70% by weight of aniline and aniline hydrochloride, expressed as the free base, and an amount of fuchsine hydrochloride equivalent to 95 parts of pararosaniline base is heated to 90°–95°C. and neutralized to a pH of 6.3 to 6.8 by addition of 50% aqueous sodium hydroxide. The mixture is then dehydrated to a water content of 1% or less by heating it to 120°C. at atmospheric pressure. The mixture is cooled to 90°–95°C. and 475 parts of a commercial dodecylbenzene fraction containing about 16% $C_{10}$—, about 43% $C_{11}$—, about 33% $C_{12}$—, and about 7% $C_{13}$—alkylbenzene (sold by Continental Oil Co. under the trademark Nalkylene) are added at a uniform rate during a 90 minute period. The resulting slurry of fuchsine hydrochloride and sodium chloride is filtered at 90°–95°C. and the filter cake is washed at room temperature with a mixture of the dodecylbenzene (165 parts) and aniline (135 parts). The combined filtrates, i.e., mother liquor and wash, contain an amount of fuchsine hydrochloride which is equivalent to 3.1 parts of pararosaniline. The recovery of fuchsine hydrochloride, therefore, is 96.8% of the amount present in the reaction mixture.

Alkali blue pigment prepared in the usual manner from the fuchsine hydrochloride recovered by the method of this example is of excellent quality.

EXAMPLE 2

The general procedure of Example 1 is followed but a second wash, with 60 parts of undiluted aniline at room temperature, of the filter cake is made. The yield and quality of the fuchsine hydrochloride are excellent.

EXAMPLE 3

A reaction mixture (490 parts) prepared as described in Example 1 and containing an amount of fuchsine hydrochloride equivalent to 56.4 parts of pararosaniline base is adjusted to a pH of 6.7 and dehydrated as in Example 1. Toluene (245 parts) is added at 90°–95°C., the resulting slurry is filtered, and the filter cake is washed with approximately 165 parts of a toluene/aniline solution containing 65% by weight aniline. The combined filtrates contain an amount of fuchsine hydrochloride which is equivalent to 3.8 parts of pararosaniline base. Approximately 93.5% of the available fuchsine hydrochloride is recovered. The fuchsine hydrochloride so obtained is converted to alkali blue in the usual manner to yield a product of excellent quality.

EXAMPLE 4

A reaction mixture (744 parts) prepared as in Example 1 and containing an amount of fuchsine hydrochloride equivalent to 94.4 parts of pararosaniline base is neutralized and dehydrated as in Example 1. Then 410 parts of biphenyl are added at 95°C. during a 90 minute period. The resulting slurry is filtered and the filter cake is washed at 95°C. with 300 parts of a biphenyl-/aniline solution containing 165 parts of biphenyl. The combined filtrates contain the equivalent of 11.5 parts of pararosaniline as fuchsine hydrochloride. A recovery of approximately 87.9% of the available fuchsine hydrochloride is thus realized. The fuchsine hydrochloride so obtained is converted in the usual manner to yield an alkali blue of good quality.

EXAMPLE 5

The general procedure of Example 1 is repeated except that the reaction mixture contains fuchsine nitrate in place of the hydrochloride. The yield and cleanliness of the recovered salt is excellent.

EXAMPLE 6

A reaction mixture (320 parts) prepared as in Example 1 and containing an amount of fuchsine hydrochloride equivalent to 35.2 parts or pararosaniline base is neutralized and dehydrated as in Example 1. The resulting reaction mixture is cooled to 90°–95°C. and 120 parts of 2,6-dimethylheptanol-4 is added at a uniform rate over 90 minutes. The resulting mixture is filtered and the filtrate contains 2.8 parts of pararosaniline base as fuchsine hydrochloride. A 92% recovery of fuchsine hydrochloride is obtained.

EXAMPLE 7

A reaction mixture (360 parts) prepared as described in Example 1 and containing an amount of fuchsine hydrochloride equivalent to 39.6 parts of pararosaniline base is neutralized and dehydrated as described in Example 1. After cooling to 90°–95°C., 2-ethylhexanol (180 parts) is added at a uniform rate over a 90 minute time period. The resulting mixture is filtered at 90°–95°C., and the filtrate contains the equivalent of 8.6 parts of pararosaniline base. The fuchsine hydrochloride recovery is 78.4%.

EXAMPLE 8

A reaction mixture (547 parts) prepared as described in Example 1 and containing an amount of fuchsine hydrochloride equivalent to 60.2 parts of pararosaniline base is neutralized and dehydrated as described in Example 1. After cooling to 90°–95°C. dihexyl ether (271 parts) is added to the mixture at 90°–95°C. and the mixture is filtered at that temperature. The filtrate contains the equivalent of 1.66 parts of pararosaniline base. The fuchsine hydrochloride present in the filter cake is, therefore, 97.2% of the amount present in the reaction mixture.

EXAMPLE 9

A reaction mixture (348 parts) prepared as described in Example 1 and containing an amount of fuchsine hydrochloride equivalent to 38.3 parts of pararosaniline base is neutralized and dehydrated as described in Example 1. After cooling to 90°–95°C., 2,4,6-trimethylpyridine (174 parts) is added at a uniform rate over a 90 minute period. The resulting mixture is filtered at 90°–95°C., and the filtrate contains the equivalent of 8.2 parts of pararosaniline base. This loss corresponds to a fuchsine hydrochloride recovery of 78.6%.

EXAMPLE 10

A reaction mixture (852 parts) prepared as described in Example 1 and containing an amount of fuchsine hydrochloride equivalent to 87.4 parts or pararosaniline base is neutralized and dehydrated as described in Example 1. Then, 4-chlorotoluene (500 parts) is added at a uniform rate over a 90 minute period. The resulting mixture is filtered at 90°–95°C. The filtrate contains the equivalent of 8.2 parts of pararosaniline base. This loss corresponds to a fuchsine recovery of 90.5%.

The above description and examples of this invention will suggest various alternatives within the spirit of this invention. The embodiments thus described therefore should not be taken as the only means of practicing the invention, the scope of which is defined by the following claims.

We claim:

1. A method of recovery of a salt having the formula:

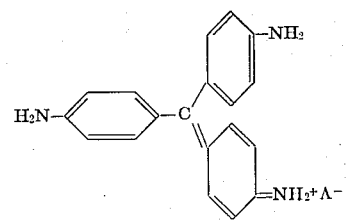

wherein A is a chloride or nitrate ion, from a mixture containing said salt and aniline; said method comprising the steps of adjusting the pH of said mixture to form about 4 to about 7.5, dehydrating the mixture to substantial dryness, precipitating the salt by adding at least one solvent-precipitant selected from the class consisting of hydrocarbons, chlorinated hydrocarbons, alcohols, ethers, and pyridines to the mixture and separating the precipitate from the mother liquor at a temperature below the decomposition temperature of the mixture.

2. The method of claim 1 wherein the solvent-precipitant is an aromatic or alkyl aromatic hydrocarbon.

3. The method of claim 1 wherein the ratio of the solvent precipitant to the mixture is from about 0.25:1 to about 0.75:1 part by weight.

4. The method of claim 1 characterized further by dehydration of the reaction mixture after the adjustment of the pH and before the addition of the solvent-precipitant.

5. The method of claim 1 wherein the pH is from about 6 to about 7.

6. The method of claim 1 wherein the temperature of the reaction mixture at the time of addition of the precipitant is from about 50°C. to about 125°C.

7. The method of claim 6 wherein the temperature is from about 80°C. to about 110°C.

8. The method of claim 2 wherein the solvent-precipitant is an alkylbenzene having from 7 to about 24 carbon atoms.

9. The method of claim 8 wherein the temperature is from about 90°C. to about 95°C.

* * * * *